US011074747B2

(12) United States Patent
Singh et al.

(10) Patent No.: US 11,074,747 B2
(45) Date of Patent: Jul. 27, 2021

(54) COMPUTER-AIDED TECHNIQUES FOR DESIGNING DETAILED THREE-DIMENSIONAL OBJECTS

(71) Applicant: AUTODESK, INC., San Rafael, CA (US)

(72) Inventors: Karansher Singh, Toronto (CA); Tovi Grossman, Toronto (CA); Kazi Rubaiat Habib, Toronto (CA); George Fitzmaurice, Toronto (CA); Rahul Arora, Toronto (CA)

(73) Assignee: AUTODESK, INC., San Rafael, CA (US)

( * ) Notice: Subject to any disclaimer, the term of this patent is extended or adjusted under 35 U.S.C. 154(b) by 0 days.

(21) Appl. No.: 16/155,847

(22) Filed: Oct. 9, 2018

(65) Prior Publication Data

US 2019/0114831 A1  Apr. 18, 2019

Related U.S. Application Data

(60) Provisional application No. 62/572,399, filed on Oct. 13, 2017.

(51) Int. Cl.
*G06T 17/10* (2006.01)
*G06F 3/01* (2006.01)
(Continued)

(52) U.S. Cl.
CPC .............. *G06T 17/10* (2013.01); *G06F 3/011* (2013.01); *G06F 3/017* (2013.01); *G06F 3/0346* (2013.01); *G06F 3/03545* (2013.01); *G06F 3/0488* (2013.01); *G06F 3/04815* (2013.01); *G06F 3/04883* (2013.01)

(58) Field of Classification Search
None
See application file for complete search history.

(56) References Cited

U.S. PATENT DOCUMENTS

2009/0148871 A1\* 6/2009 Mattingly ................ C12Q 1/26
435/11
2009/0279062 A1\* 11/2009 Direcks .................. G03B 27/52
355/30

(Continued)

OTHER PUBLICATIONS

"Gravity Sketch—Home", https://www.gravitysketch.com/, retrieved Mar. 24, 2020, 9 pages.

(Continued)

*Primary Examiner* — Yanna Wu
(74) *Attorney, Agent, or Firm* — Artegis Law Group, LLP

(57) ABSTRACT

In various embodiments, a sketching application generates models of three-dimensional (3D) objects. In operation, the sketching application generates a first virtual geometry based on a first free-form gesture. Subsequently, the sketching application generates a second virtual geometry based on a first constrained gesture associated with a two-dimensional (2D) physical surface. The sketching application then generates a model of a 3D object based on the first virtual geometry and the second virtual geometry. Advantageously, because the sketching application generates virtual geometries based on a combination of free-form and constrained gestures, the sketching application efficiently generates accurate models of detailed 3D objects.

20 Claims, 3 Drawing Sheets

(51) Int. Cl.
G06F 3/0488 (2013.01)
G06F 3/0354 (2013.01)
G06F 3/0346 (2013.01)
G06F 3/0481 (2013.01)

(56) References Cited

U.S. PATENT DOCUMENTS

| | | | | |
|---|---|---|---|---|
| 2010/0070061 | A1* | 3/2010 | Volto | G01F 23/0076 700/98 |
| 2013/0009948 | A1* | 1/2013 | Berger | G06T 19/00 345/419 |
| 2019/0034076 | A1* | 1/2019 | Vinayak | G06F 3/017 |
| 2019/0243469 | A1* | 8/2019 | Kuribayashi | G09G 5/10 |

OTHER PUBLICATIONS

"Mixed Reality Toolkit—Unity", https://github.com/Microsoft/MixedRealityToolkit-Unity, retrieved Mar. 24, 2020, 8 pages.
"Pixologic : ZBrush—The all-in-one-digital sculpting solution", http://pixologic.com, retrieved Mar. 24, 2020, 4 pages.
"Tilt Brush by Google", https://www.tiltbrush.com/, retrieved Mar. 24, 2020, 14 pages.
Abbasinejad et al., "Surface Patches from Unorganized Space Curves", Computer Graphics Forum, DOI: http://dx.doi.org/10.1111/j.1467-8659.2011.02012.x, vol. 30, No. 5, Aug. 2011, pp. 1379-1387.
Angus et al., "Embedding the 2D Interaction Metaphor in a Real 3D Virtual Environment", International Society for Optics and Photonics, DOI: http://dx.doi.org/10.1117/12.205875, vol. 2409, 1995, pp. 282-294.
Arora et al., "Experimental Evaluation of Sketching on Surfaces in VR", In Proceedings of the 2017 CHI Conference on Human Factors in Computing Systems (CHI '17), ACM, DOI: http://dx.doi.org/10.1145/3025453.3025474, May 6-11, 2017, pp. 5643-5654.
Bae et al., "ILoveSketch: As-Natural-As-Possible Sketching System for Creating 3D Curve Models", In Proceedings of the 21st annual ACM symposium on User interface software and technology, ACM, DOI: http://dx.doi.org/10.1145/1449715.1449740, Oct. 19-22, 2008, pp. 151-160.
Bae et al., "EverybodyLovesSketch:3D Sketching for a Broader Audience", In Proceedings of the 22Nd Annual ACM Symposium on User Interface Software and Technology (UIST '09). ACM, DOI: http://dx.doi.org/10.1145/1622176.1622189, Oct. 4-7, 2009, pp. 59-68.
Bessmeltsev et al., "Design-Driven Quadrangulation of Closed 3D Curves", DOI: http://dx.doi.org/10.1145/2366145.2366197, ACM Transactions on Graphics, vol. 31, No. 6, Article 178, Nov. 2012, pp. 178:1-178:11.
Bishop, Richard L., "There is More than One Way to Frame a Curve", The American Mathematical Monthly, DOI: http://dx.doi.org/10.2307/2319846, vol. 82, No. 3, Mar. 1975, pp. 246-251.
Bowman et al., "Designing Animal Habitats within an Immersive VE", DOI: http://dx.doi.org/10.1109/38.708555, IEEE Computer Graphics and Applications, vol. 18, No. 5, Sep. 1998, pp. 9-13.
Bowman et al., "Design and Evaluation of Menu Systems for Immersive Virtual Environments", DOI: http://dx.doi.org/10.1109/VR.2001.913781, In Proceedings IEEE Virtual Reality 2001, 2001, pp. 149-156.
Chen et al., "Sketching Reality: Realistic Interpretation of Architectural Designs", DOI: http://dx.doi.org/10.1145/1356682.1356684, ACM Transactions Graphics, vol. 27, No. 2, Apr. 2008, pp. 11:1-11:15.
Chen et al., "Reprise: A Design Tool for Specifying, Generating, and Customizing 3D Printable Adaptations on Everyday Objects", DOI: http://dx.doi.org/10.1145/2984511.2984512, ACM, Oct. 16-19, 2016, pp. 29-39.
Cheng et al., "Interaction Paradigms for Bare-Hand Interaction with Large Displays at a Distance", DOI: 10.5772/7733, In Human-Computer Interaction, Inaki Maurtua (Ed.). In Tech, Dec. 2009, pp. 195-222.
Cipiloglu et al., "A Framework for Enhancing Depth Perception in Computer Graphics", DOI: http://dx.doi.org/10.1145/1836248.1836276, Jul. 23-24, 2010, pp. 141-148.
Constine, Josh, "Oculus "Quill" Turns VR Painting Into Performance Art", http://social.techcrunch.com/2016/01/26/oculus-quill/, Jan. 27, 2016, 14 pages.
De Paoli et al., "SecondSkin: Sketch-based Construction of Layered 3D Models", DOI: http://dx.doi.org/10.1145/2766948, ACM Transactions on Graphics, vol. 34, No. 4, Article 126, Aug. 2015, pp. 126:1-126:10.
Deering, Michael F., "HoloSketch: A Virtual Reality Sketching/Animation Tool", DOI: http://dx.doi.org/10.1145/210079.210087, ACM Transactions Computer-Human Interaction, vol. 2, No. 3, Sep. 1995, pp. 220-238.
Donato et al., "Approximate Thin Plate Spline Mappings", DOI: 10.1007/3-540-47977-5_2, http://link.springer.com/10.1007/3-540-47977-5_2, ECCV 2002, LNCS, vol. 2352, 2002, pp. 21-31.
Eberly, David, "Least Squares Fitting of Data", available at https://www.ncorr.com/download/publications/eberlyleastsquares.pdf, Feb. 9, 2008, pp. 1-10.
Eissen et al., "Sketching: The Basics; The Prequel to Sketching: Drawing Techniques for Product Designers", BIS, Amsterdam, OCLC: 756275344, 2011, pp. 1-204.
Fiorentino et al., "3D Sketch Stroke Segmentation and Fitting in Virtual Reality", In International Conference Graphicon, 2003, 8 pages.
Grossman et al., "Creating Principal 3D Curves with Digital Tape Drawing", In Proceedings of the SIGCHI Conference on Human Factors in Computing Systems (CHI '02), DOI: http://dx.doi.org/10.1145/503376.503398, ACM, vol. 4, No. 1, Apr. 20-25, 2002, pp. 121-128.
Hanson et al., "Parallel Transport Approach to Curve Framing", ftp://ftp.cs.indiana.edu/pub/hanson/iucs-tr425.ps, Technical Report TR425, 4-7 pages, Jan. 11, 1995, pp. 1-20.
Kallio, Kiia, "3D6B Editor: Projective 3D Sketching with Line-Based Rendering", The Eurographics Association, http://diglib.eg.org/handle/10.2312/SBM.SBM05.073-079, DOI: 10.2312/SBM/SBM05/073-079, 2005, 7 pages.
Kara et al., "Sketch-Based 3D-Shape Creation for Industrial Styling Design", DOI: http://dx.doi.org/10.1109/MCG.2007.18, IEEE Computer Graphics and Applications, vol. 27, No. 1, Jan./Feb. 2007, pp. 60-71.
Kazi et al., "DreamSketch: Early Stage 3D Design Explorations with Sketching and Generative Design", ACM, https://doi.org/10.1145/3126594.3126662, Oct. 22-25, 2017, 14 pages.
Keefe et al., "Drawing on Air: Input Techniques for Controlled 3D Line Illustration", http://ieeexplore.ieee.org/xpls/abs_all.jsp?arnumber=4135646, IEEE Transactions on Visualization and Computer Graphics, vol. 13, No. 5, Sep./Oct. 2007, pp. 1067-1081.
Keefe et al., "CavePainting: A Fully Immersive 3D Artistic Medium and Interactive Experience", DOI: http://dx.doi.org/0.1145/364338.364370, In Proceedings of the 2001 symposium on Interactive 3D graphics. ACM, 2001, pp. 85-93.
Kim et al., "SketchingWithHands: 3D Sketching Handheld Products with First-Person Hand Posture", DOI: http://dx.doi.org/10.1145/2984511.2984567, In Proceedings of the 29th Annual Symposium on User Interface Software and Technology (UIST '16), ACM, Oct. 16-19, 2016, pp. 797-808.
KRS et al., "Skippy: Single View 3D Curve Interactive Modeling", DOI: http://dx.doi.org/10.1145/3072959.3073603, ACM Transactions on Graphics, vol. 36, No. 4, Article 128, Jul. 2017, pp. 128:1-128:12.
Lapides et al., "The 3D Tractus: A Three-Dimensional Drawing Board", DOI: http://dx.doi.org/10.1109/TABLETOP.2006.33, IEEE, 2006, pp. 169-176.
Li et al., "SweepCanvas:Sketch-based 3D Prototyping on an RGB-D Image", http://dx.doi.org/10.1145/3126594.3126611, ACM, Oct. 22-25, 2017, pp. 387-399.
Lucas III, John F., "Design and Evaluation of 3D Multiple Object Selection Techniques", Ph.D. Dissertation, Virginia Tech, Jan. 2005, 87 pages.
Paczkowski et al., "Insitu: Sketching Architectural Designs in Context", DOI: http://dx.doi.org/10.1145/2024156.2024216, In Pro-

(56) References Cited

OTHER PUBLICATIONS ceedings of the 2011 SIGGRAPH Asia Conference (SA '11), ACM, vol. 30, No. 6, Article 182, Dec. 2011, pp. 182:1-182:10.

Sachs et al., "3-Draw: A Tool for Designing 3D Shapes", DOI: http://dx.doi.org/10.1109/38.103389, IEEE Computer Graphics and Applications, vol. 11, No. 6, Nov. 1991, pp. 18-26.

Sadri et al., "Flow-Complex-Based Shape Reconstruction from 3D Curves", DOI:http://dx.doi.org/10.1145/2560328, ACM Transactions on Graphics, vol. 33, No. 2, Article 20, Mar. 2014, pp. 20:1-20:15.

Schkolne et al., "Surface Drawing: Creating Organic 3D Shapes with the Hand and Tangible Tools", DOI: http://dx.doi.org/10.1145/365024.365114, In Proceedings of the SIGCHI Conference on Human Factors in Computing Systems (CHI '01). ACM, Mar. 31-Apr. 4, 2001, pp. 261-268.

Schmidt et al., "Analytic Drawing of 3D Scaffolds", DOI: http://dx.doi.org/10.1145/1661412.1618495, ACM Transactions on Graphics, vol. 28, No. 5, Article 149, Dec. 2009, pp. 149:1-149:10.

Schmidt et al., "Sketch-Based Procedural Surface Modeling and Compositing Using Surface Trees", DOI: http://dx.doi.org/10.1111/j.1467-8659.2008.01129.x, Computer Graphics Forum, vol. 27, No. 2, Apr. 2008, pp. 321-330.

Singh, Karan, "Industrial motivation for interactive shape modeling: a case study in conceptual automotive design", DOI: http://dx.doi.org/10.1145/1185657.1185671, ACM Press, vol. 3, 2006, pp. 3-9.

Sutherland, Ivan Edward, "Sketchpad: A man-machine graphical communication system", DOI: http://dx.doi.org/10.1145/1461551.1461591, ACM Press, vol. 329, No. 574, 1963, pp. 1-149.

Szalavari et al., "The Personal Interaction Panel—a Two-Handed Interface for Augmented Reality", DOI: http://dx.doi.org/10.1111/1467-8659.00137, Computer Graphics Forum, vol. 16, No. 3, Sep. 1997, pp. C335-C346.

Tano et al., "Truly Useful 3D Drawing System for Professional Designer by "Life-Sized and Operable" Feature and New Interaction", DOI: 10.1007/978-3-642-40483-2_3, In Human-Computer Interaction—Interact 2013, Interact 2013, Part I, LNCS 8117, 2013, pp. 37-55.

Thiel et al., "Elasticurves: Exploiting Stroke Dynamics and Inertia for the Real-time Neatening of Sketched 2D Curves", DOI: http://dx.doi.org/10.1145/2047196.2047246, In Proceedings of the 24th annual ACM symposium on User interface software and technology, ACM, Oct. 16-19, 2011, pp. 383-392.

Wesche et al., "FreeDrawer—A Free-Form Sketching System on the Responsive Workbench", DOI: http://dx.doi.org/10.1145/505008.505041, ACM Press, Nov. 15-17, 2001, pp. 167-174.

Xu et al., "True2Form: 3D Curve Networks from 2D Sketches via Selective Regularization", DOI: http://dx.doi.org/10.1145/2601097.2601128, ACM Transactions on Graphics, vol. 33, No. 4, Jul. 2014, pp. 131:1-131:13.

Yang et al., "An Analysis of Sketching Skill and Its Role in Early Stage Engineering Design", Journal of Mechanical Design, vol. 129, No. 5, DOI: 10.1115/1.2712214, May 2007, pp. 476-482.

Zheng et al., "Smartcanvas: Context-inferred Interpretation of Sketches for Preparatory Design Studies", DOI: 10.1111/cgf.12809, In Computer Graphics Forum, vol. 35, No. 2, 2016, pp. 37-48.

Schmidt et al., "Interactive Decal Compositing with Discrete Exponential Maps", ACM Transactions on Graphics 25, 3, Jul. 2006, pp. 605-613.

* cited by examiner

COMPUTER-AIDED TECHNIQUES FOR DESIGNING DETAILED THREE-DIMENSIONAL OBJECTS

CROSS-REFERENCE TO RELATED APPLICATIONS

Field of the Various Embodiments

This application claims the priority benefit of the U.S. Provisional patent application having Ser. No. 62/572,399 and filed on Oct. 13, 2017. The subject matter of this related application is hereby incorporated herein by reference.

BACKGROUND

Field of the Various Embodiments

Embodiments of the present invention relate generally to computer-aided design software and, more specifically, to computer-aided techniques for designing detailed three-dimensional objects.

Description of the Related Art

Computer-aided design (CAD) tools are used to facilitate the design of three-dimensional (3D) objects for a wide variety of purposes. For instance, some CAD applications facilitate the design of 3D objects for subsequent fabrication by a 3D printer. Other CAD applications facilitate the design of 3D characters for use in video games. Oftentimes, these types of CAD applications enable a user to generate a digital model of the 3D object by performing sketching operations to conceptualize and design the 3D object.

In one conventional approach for performing sketching operations, a CAD application receives two-dimensional (2D) input associated with gestures performed by the user via a 2D input subsystem, generates 3D virtual geometries based on the input, and displays the 3D virtual geometries as 2D images on a 2D display device. For example, the CAD application could receive 2D input derived from gestures performed on the touch-screen of a tablet by the user, generate 3D virtual geometries based on the 2D input, and display the 3D virtual geometries as 2D images on the touch-screen. One drawback of this type of "2D sketching" is that conveying the absolute 3D depths of complex geometries based on 2D input from a single viewpoint is difficult. In particular, generating virtual geometries that accurately represent visual aspects of a relatively complex 3D object usually requires multiple 2D sketches of the 3D object from disparate viewpoints using construction lines, perspective grids, scaffolds, and the like. As a result, the overall process of generating models of 3D objects using "2D sketching" techniques is oftentimes time-consuming and tedious.

In another conventional approach for performing sketching operations, a CAD application receives 3D input associated with gestures performed in mid-air by the user via a 3D input subsystem, generates 3D virtual geometries based on the 3D input, and displays the 3D virtual geometries as 3D images in mid-air. Notably, the 3D input associated with such "3D sketching" inherently conveys the absolute 3D depths of complex geometries. One drawback of this type of "3D sketching" is that 3D input subsystems typically lack the precision and constraints needed to describe detailed geometries. More specifically, because 3D input subsystems do not provide physical drawing surfaces that constrain, support, and steady user gestures, users are unable to gesture comfortably and in detail or with adequate precision. Accordingly, describing geometries using 3D input is inherently imprecise, and the overall quality of the resulting 3D models can be substantially reduced.

As the foregoing illustrates, what is needed in the art are more effective techniques for generating models of 3D objects.

SUMMARY

One embodiment of the present invention sets forth a computer-implemented method for generating models of three-dimensional (3D) objects. The method includes generating a first virtual geometry based on a first free-form gesture; generating a second virtual geometry based on a first constrained gesture associated with a two-dimensional (2D) physical surface; and generating a model of a 3D object based on the first virtual geometry and the second virtual geometry.

At least one technical advantage of the disclosed techniques relative to prior art solutions is that the disclosed techniques integrate free-form gestures and constrained gestures to efficiently generate a precise model of a 3D object. In particular, the disclosed techniques generate surface patches based on 3D free-form gestures that accurately and efficiently convey the 3D depths of surfaces. In a complementary fashion, the disclosed techniques project 2D constrained gestures performed on the 2D physical surface onto surface patches to generate 3D curves that precisely represent detailed geometries. By rendering 3D surface patches to the 2D physical surface to facilitate precise 2D gesturing, the disclosed techniques enable users to efficiently and accurately describe complex 3D geometries using a coordinated mix of free-form gestures and constrained gestures. These technical advantages provide one or more technological advancements over the prior art.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

System Overview

Figure 1:
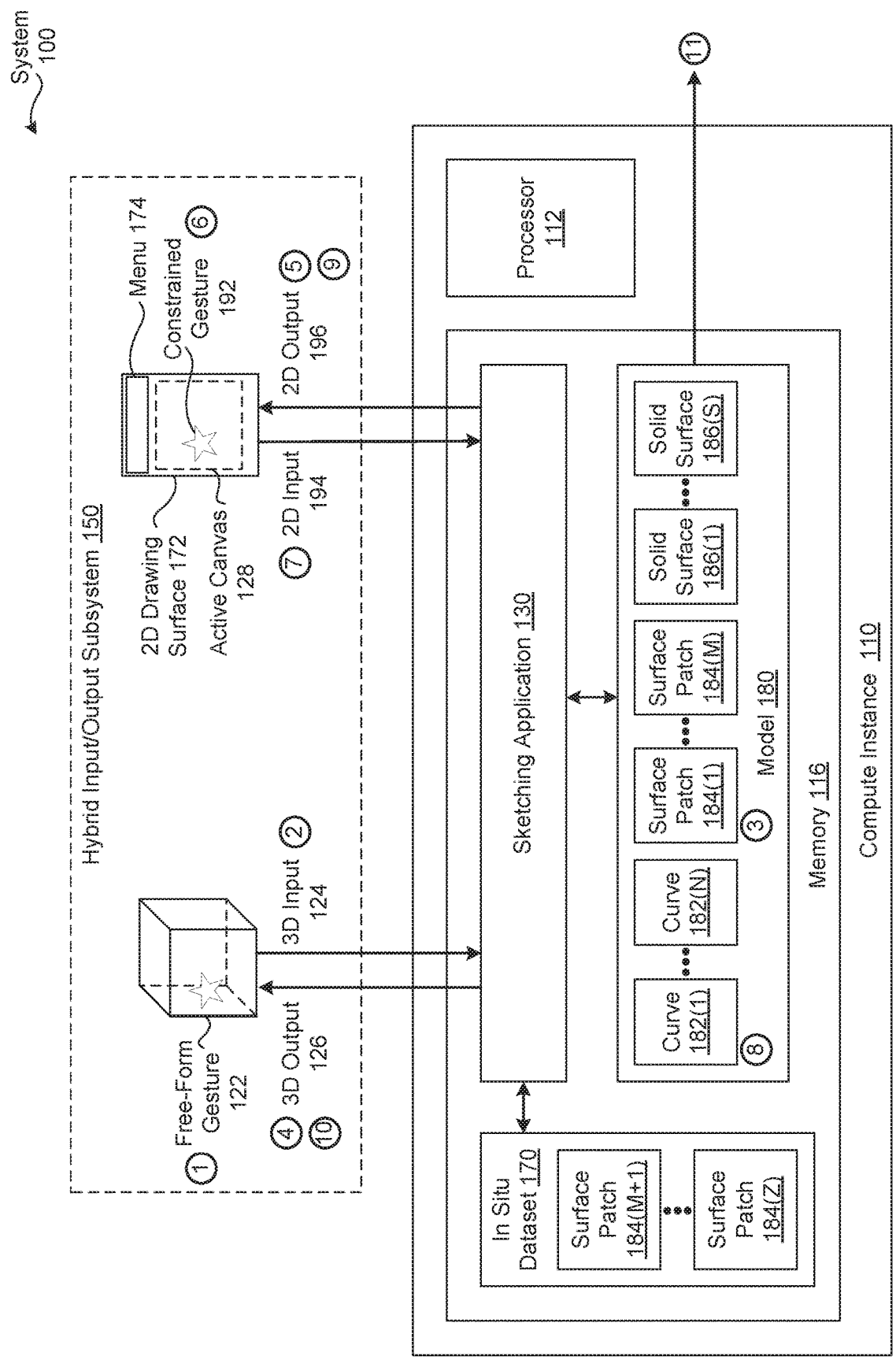
FIG. 1 is a conceptual illustration of a system configured to implement one or more aspects of the present invention.

FIG. 1 is a conceptual illustration of a system 100 configured to implement one or more aspects of the present invention. As shown, the system 100 includes, without limitation, a compute instance 110 and a hybrid input/output subsystem 150. In alternate embodiments, the system 100 may include any number of compute instances 110. For explanatory purposes, multiple instances of like objects are denoted with reference numbers identifying the object and parenthetical numbers identifying the instance where needed.

In various embodiments, any number of the components of the system 100 may be distributed across multiple geographic locations or implemented in one or more cloud computing environments (i.e., encapsulated shared resources, software, data, etc.) in any combination. In alternate embodiments, the system 100 may include any number of compute instances 110 and any number of hybrid input/output subsystems 150. Further, the hybrid input/output subsystem 150 may be replaced with any number of input systems and any number of output systems.

As shown, the compute instance 110 includes, without limitation, a processor 112 and a memory 116. The processor 112 may be any instruction execution system, apparatus, or device capable of executing instructions. For example, the processor 112 could comprise a central processing unit (CPU), a graphics processing unit (GPU), a controller, a microcontroller, a state machine, or any combination thereof. The memory 116 stores content, such as software applications and data, for use by the processor 112 of the compute instance 110. In alternate embodiments, the compute instance 110 may include any number of processors 112 and any number of memories 116 in any combination. In particular, any number of compute instances 110 (including one) may provide a multiprocessing environment in any technically feasible fashion.

The memory 116 may be one or more of a readily available memory, such as random access memory (RAM), read only memory (ROM), floppy disk, hard disk, or any other form of digital storage, local or remote. In some embodiments, a storage (not shown) may supplement or replace the memory 116. The storage may include any number and type of external memories that are accessible to the processor 112. For example, and without limitation, the storage may include a Secure Digital Card, an external Flash memory, a portable compact disc read-only memory (CD-ROM), an optical storage device, a magnetic storage device, or any suitable combination of the foregoing.

The compute instance 110 is configured to implement one or more applications or subsystems of applications. For explanatory purposes only, each application is depicted as residing in the memory 116 of a single compute instance 110 and executing on a processor 112 of the single compute instance 110. However, as persons skilled in the art will recognize, the functionality of each application may be distributed across any number of other applications that reside in the memories 116 of any number of compute instances 110 and execute on the processors 112 of any number of compute instances 110 in any combination. Further, the functionality of any number of applications or subsystems may be consolidated into a single application or subsystem.

In particular, the compute instance 110 is configured to automatically generate a model 180 of one or more three-dimensional (3D) objects (not shown) as part of a conceptualization and design process. In general, the model 180 represents the associated 3D objects digitally in any technically feasible fashion. More specifically, the model 180 includes, without limitation, any number of virtual geometries, where each virtual geometry digitally represents a portion of the associated 3D object(s) that may or may not actually exist. In some embodiments, the model 180 may be used to manufacture the 3D object. In the same or other embodiments, the model 180 may be used to represent the 3D object in another application, such as a video game.

As persons skilled in the art will recognize, in conventional systems, oftentimes a conventional computer-aided design (CAD) application enables a user to generate a digital model of a 3D object by performing sketching operations to conceptualize and design the 3D object. In one conventional approach for performing sketching operations, a CAD application interacts with a 2D input subsystem and a 2D output subsystem to, respectively, generate and display virtual geometries included in a model. For example, the 2D input subsystem could be a trackpad and the 2D output subsystem could be a light-emitting diode (LED) display. Alternatively, the 2D input subsystem and the 2D output subsystem could be replaced with a single 2D input/output device, such as a 2D touch-screen of a tablet. One drawback of this type of "2D sketching" is that to determine the absolute 3D depths of complex 3D geometries, oftentimes the conventional CAD application requires multiple 2D sketches of the 3D object from disparate viewpoints. As a result, the overall process of generating accurate models of complex 3D objects using "2D sketching" techniques is oftentimes time-consuming and tedious.

In another conventional approach for performing sketching operations, a conventional CAD application interacts with a 3D input subsystem and a 3D output subsystem to, respectively, generate and display virtual geometries included in a model. For example, the 3D input subsystem could be a 3D motion tracking subsystem and the 3D output subsystem could be a 3D television. One drawback of this type of "3D sketching" is that while the 3D input inherently conveys the absolute 3D depths of 3D geometries, 3D input systems typically lack the precision and constraints needed to precisely describe detailed geometries. More specifically, because 3D input systems do not provide physical drawing surfaces that constrain, support, and steady user gestures, users are unable to provide 3D input comfortably and in detail or with adequate precision. Consequently, describing virtual geometries using 3D input is imprecise, and the overall quality of the associated models are often unnecessarily bounded.

Generating 3D Models Based on a Combination of 2D and 3D Input

To efficiently and accurately generate the model 180 irrespective of the complexity of the represented 3D object(s), the system 100 includes, without limitation, the hybrid input/output subsystem 150 and a sketching application 130. The hybrid input/output subsystem 150 includes, without limitation, any number of components that provide 3D input 124, any number of components that display 3D output 126, any number of components that provide 2D input 194, and any number of components that display 2D output 196 on any number of 2D drawing surfaces 172. Each 2D drawing surface 172 may be any planar surface, such as a table or a touch-screen of a tablet. The components of the hybrid input/output subsystem 150 may be distributed across any number of geographic locations. For instance, the hybrid input/output subsystem 150 could receive 3D input 124 from, receive 2D input 194 from, display 3D output 126 to, and display 2D output 196 to nine different users distributed across multiple cities.

The hybrid input/output subsystem 150 generates the 3D input 124 based on free-form gestures 122. Each free-form gesture 122 may be any type of mid-air or in situ movement. For instance, a free-form gesture 122 could be a mid-air movement or a movement that is performed on an existing object, such as the foot of a person. By contrast, the hybrid input/output subsystem 150 generates the 2D input 196 based on constrained gestures 192. Each constrained gesture 182 is a movement performed on a 2D drawing surface 172. The 2D drawing surface 172 may be any planar surface, such as a table or a touch-screen of a tablet. Each constrained gesture 182 may be performed in any technically feasible fashion. For instance, in some embodiments, the constrained gestures 182 may be performed using a hand, finger, stylus, mouse, or any combination thereof. To facilitate efficient gesturing, the hybrid input/output subsystem 150 continually displays the 3D output 126 in mid-air or in situ and the 2D output 196 on the 2D drawing surface 172. As described in greater detail below, the sketching application 130 generates both the 3D output 126 and the 2D output 196 based on the model 180.

The hybrid input/output subsystem 150 may be implemented in any technically feasible fashion. Further, each of the 3D input portion, the 2D input portion, the 3D output portion, and the 2D output portion of the hybrid input/output subsystem 150 may be implemented separately from the other portions of the hybrid input/output subsystem 150. For instance, in some embodiments, the hybrid input/output subsystem 150 includes, without limitation, an augmented reality (AR) capable head-mounted display (HMD), a tablet that includes the 2D drawing surface 172, a digital pen with 6-degrees of freedom (DoF) that is tracked by any number of motion capture cameras, and a mouse.

The digital pen is used for gesturing mid-air, on the tablet, and on-and-around physical objects in the local environment. The mouse is magnetically fastened to the back of the table and is used to switch between various operating modes (not shown in FIG. 1) and/or define the input source. For instance, clicking the left mouse button could signify that the movements of the digital pen are to be regarded as the free-form gestures 122. In conjunction with the digital pen, the tablet provides the 2D input 194 to the sketching application 130. Further, the tablet displays the 2D output 196 received from the sketching application as well as a menu 174 that provides any amount of additional user input. Examples of additional user input include, without limitation, a request to change the operating mode, a request to save the model 180 in a specific file format, and a request to change the color associated with a virtual geometry, to name a few. The menu 174 may include, without limitations, any number and type of widgets that facilitate any amount and type of additional user input in any technically feasible fashion.

In alternate embodiments, the sketching application 130 and/or the hybrid input/output subsystem 150 may implement any number and type of components, widgets, and the like that provide the 3D input 124, the 2D input 194, and any amount of additional input to the sketching application 130 in any technically feasible fashion. The sketching application 130 and/or the hybrid input/output subsystem 150 may also implement any number and type of components, widgets, and the like that customize the 3D output 126, the 2D output 196, and any amount of additional output from the sketching application 130 in any technically feasible fashion As shown, the sketching application 130 resides in the memory 116 of the compute instance 110 and executes on the processor 112 of the compute instance 110. In operation, the sketching application 130 integrates the 3D input 124 and the 2D input 194 to generate virtual geometries that are included in the model 180. The model 180 includes, without limitation, any number of curves 182, any number of surface patches 184, and any number of solid surfaces 186. Each of the curves 182 may be 3D or 2D, each of the surfaces patches 184 represents a 3D surface or a 2D surface, and each of the solid surfaces 186 represents an enclosed region. Importantly, the sketching application 120 may associate each of the curves 182 with any number of the surface patches 184 and/or any number of the solid surfaces 186 in any technically feasible fashion. As referred to herein, the curves 182, the surface patches 184, and the solid surfaces 186 are "virtual geometries" included in the model 180. In alternate embodiments, the model 180 may include any number and type of virtual geometries and any amount and type of additional data items that facilitate representing visual aspects of any number of 2D and 3D objects.

As the sketching application 130 generates the virtual geometries in the model 180, the sketching application 130 generates the 3D output 126 and the 2D output 196 that visually represent the model 180 in real-time. The 3D output 126 visually represents virtual geometries that are included in the model 180 and is defined based on three display dimensions. By contrast, the 2D output 196 is a 2D rendered version of an active canvas 128 and the associated curves 182 and, consequently, is defined based on two display dimensions. Initially, the sketching application 130 sets the active canvas equal to a default planar canvas, such as a rectangle. Subsequently, the sketching application 130 may set the active canvas 128 equal to a planar canvas, one or the surface patches 184 included in the model 180, or one of the surface patches 184 included in an in situ dataset 170. At any given time, the active canvas 128 is equal to a single planar canvas or surface patch 184, and the active canvas 128 may change over time.

The in situ dataset 170 includes, without limitation, any number of the surface patches 184. The surface patches 184 included in the in situ dataset 170 represent different portions of existing, physical objects that are located within a canonical workspace (not shown in FIG. 1). As described in greater detail in conjunction with FIG. 2, the canonical workspace is an operating region associated with the 3D input 124 provided by the hybrid input/output subsystem 150. The sketching application 130, the hybrid input/output subsystem 150, and/or any other application may generate the in situ dataset 170 in any technically feasible fashion.

The sketching application 130 may update the active canvas 128 in any technically feasible fashion based on any amount and type of information. For instance, in some embodiments, after generating a new surface patch 184, the sketching application 130 sets the active canvas 128 equal to the new surface patch 184. In the same or other embodiments, the menu 174 includes, without limitation, widgets for updating an active canvas specification (not shown in FIG. 1) that specifies the active canvas 128.

Notably, the sketching application 130 continually projects an orthographic view of the active canvas 128 and any associated curves 182 to the 2D drawing surface 172 via the 2D output 196. The sketching application 130 may project the orthographic view in any technically feasible fashion. For instance, if the 2D drawing surface 172 is the display screen of a tablet, then the sketching application 130 could position an orthographic camera associated with the tablet in front of the active canvas 128 to maximize the projection area onto the 2D drawing surface 172. To facilitate comfortable 2D sketching, the sketching application 130 could fix the position of the orthographic camera irrespective of the position and orientation of the tablet.

In a complementary fashion, the sketching application 130 constrains the 2D input 194 to the active canvas 128. As a user draws on the 2D drawing surface 172 using the constrained gestures 192, the sketching application 130 automatically projects the constrained gestures 192 onto the surface patch 184 that is visible via the 2D drawing surface 172. Advantageously, by automatically mapping precise constrained gestures 192 performed on the rigid 2D drawing surface 172 to the active canvas 128, the sketching application 130 mitigates the inaccuracies typically associated with free-form gestures 122.

In various embodiments, the sketching application 130 may provide any amount and type of visual aids via the 2D output 196 and/or the 3D output 126 to facilitate precise and accurate gesturing. For instance, in some embodiments, when the sketching application 130 detects that a digital pen is proximate to the 2D drawing surface 172, the sketching application 130 displays a mid-air virtual pointer at the projected position within the mid-air representation of the 3D model. The mid-air virtual pointer enables users to easily comprehend the 3D positions of the virtual geometries resulting from the constrained gestures 192. In the same or other embodiments, the sketching application 130 superimposes a grid texture on the active canvas 128.

Figure 2:
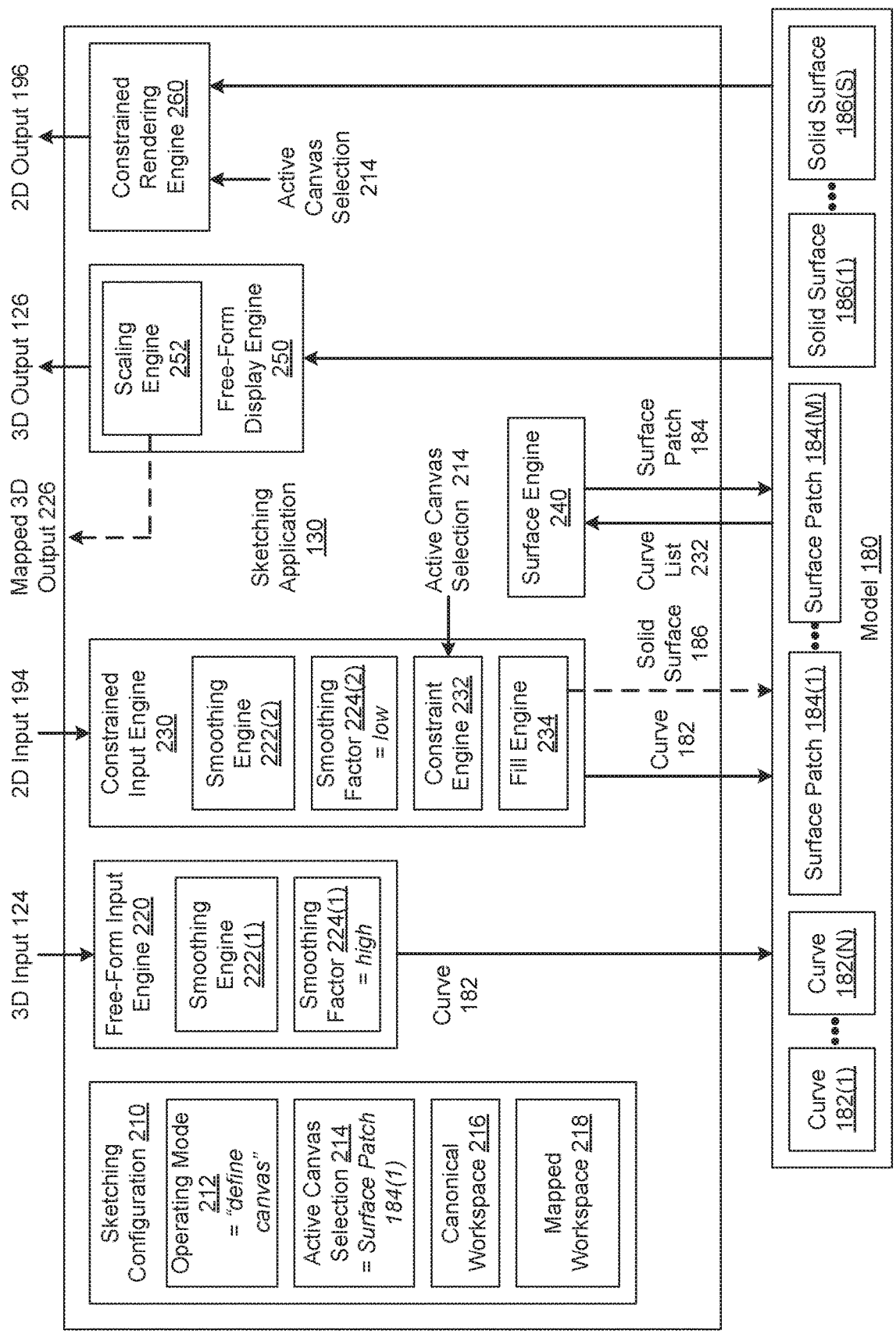
FIG. 2 is a more detailed illustration of the sketching application of FIG. 1, according to various embodiments of the present invention.

Further, and as described in greater detail in conjunction with FIG. 2, the sketching application 130 may provide a variety of functionality and sketching tools that facilitate a conceptualization and design process. For instance, in some embodiments, the sketching application 130 provides gesture smoothing functionality, scaling functionality, translation tools, color tools, undo/redo tools, file export tools, bookmark tools, and a pencil tool for temporary input.

For explanatory purposes only, FIG. 1 depicts a conceptual and design process using a series of numbered bubbles. First, as depicted with the bubble numbered 1 and while the sketching application 130 is in a "define canvas" operating mode, the free-form gesture 122 corresponding to a vertical line is performed in mid-air via the hybrid input/output subsystem 150. The free-form gesture 122 is the final gesture in a sequence of free-form gestures that describes the front surface of a 3D cube. As depicted with the bubble numbered 2, the hybrid input/output subsystem 150 generates the 3D input 124 associated with the free-form gesture 122 and transmits the 3D input 124 to the sketching application 130. In response to the 3D input 124, the sketching application 130 generates the surface patch 184 representing the front surface of the 3D cube. The sketching application 130 then adds the "front" surface patch 184 to the model 180 (bubble numbered 3) and sets the active canvas equal to the front surface patch 184.

As part of updating the model 180, the sketching application 130 generates the 3D output 126 that represents the virtual geometries in the model 180. As depicted with the bubble numbered 4, the sketching application 130 then transmits the 3D output 126 to the hybrid input/output subsystem 150 for display in mid-air. In a complimentary fashion, the sketching application 130 generates an orthographic view of the front surface patch 184. The sketching application 130 then transmits the orthographic view to the hybrid input/output subsystem 150 as the 2D output 196 (bubble numbered 5). In response, the hybrid input/output subsystem 150 displays the orthographic view on the 2D drawing surface 172.

As depicted with the bubble numbered 6, the hybrid input/output subsystem 150 receives a series of constrained gestures 192 that are performed on the 2D drawing surface 172. The series of constrained gestures 192 define a star. In response, as depicted with the bubble numbered 7, the hybrid input/output subsystem 150 transmits the corresponding 2D input 194 to the sketching application 130. As depicted with the bubble numbered 8, the sketching application 130 constrains the 2D input 194 to the active canvas 128 to generate the curves 182 representing the star on the front surface of the cube. The sketching application 130 then adds the "star" curves 182 to the model 180 and associates the star curves 182 with the front surface patch 184.

As part of updating the model 180, the sketching application 130 generates an orthographic view of the front surface patch 184 and the star curves 182. The sketching application 130 then transmits the orthographic view to the hybrid input/output subsystem 150 as the 2D output 196 (bubble numbered 9). In response, the hybrid input/output subsystem 150 displays the orthographic view on the 2D drawing surface 172. In a complementary fashion, the sketching application 130 generates the 3D output 126 that represents the virtual geometries in the model 180. As depicted with the bubble numbered 10, the sketching application 130 then transmits the 3D output 126 to the hybrid input/output subsystem 150 for display in mid-air. Finally, as depicted with the bubble numbered 11, the sketching applicable 130 generates a file that described the model 180 in a geometry definition file format for further processing.

Note that the techniques described herein are illustrative rather than restrictive, and may be altered without departing from the broader spirit and scope of the invention. Many modifications and variations will be apparent to those of ordinary skill in the art without departing from the scope and spirit of the described embodiments and techniques. As a general matter, the techniques outlined herein are applicable to generating virtual geometries included in any type of model of any numbers of 3D objects based on both gestures performed in mid-air or in situ and gestures performed on any 2D surface.

Further, in alternate embodiments, the functionality of the sketching application 130 and the hybrid input/output subsystem 150 as described herein may be distributed across any number of other applications and components that may or may not be included in the system 100. For instance, any amount of the display functionality of the hybrid input/output subsystem 150 may be partitioned into a 2D display system and a 3D display system that provides a virtual reality (VR) environment or an augmented reality (AR) environment.

Combining 2D and 3D Input to Generate Virtual Geometries

FIG. 2 is a more detailed illustration of the sketching application 130 of FIG. 1, according to various embodiments of the present invention. As shown, the sketching application 130 includes, without limitation, a sketching configuration 210, a free-form input engine 220, a constrained input engine 230, a surface engine 240, a free-form display engine 250, and a constrained rendering engine 260.

The sketching configuration 210 includes, without limitation, an operating mode 212, an active canvas selection 214, a canonical workspace 216, and a mapped workspace 218. The operating mode 212 specifies how the sketching application 130 is to interpret the 3D input 124 and the 2D input 194. However, irrespective of the operating mode 212, the sketching application 130 constrains the 2D output 196 and the 2D input 194 based on the active canvas 128.

For instance, in the operating mode 212 "define surface," the sketching application 130 interprets the 3D input 124 and the 2D input 194 as curves 182 that are included in a curve list 232 for subsequent use in defining a new surface patch 184. In the operating mode 212 "generate surface," the sketching application 130 generates a new surface patch 184 based on an associated curve list 232. In the operating mode 212 "sketching," the sketching application 130 interprets both the 3D input 124 and the 2D input 194 as curves 182.

As persons skilled in the art will recognize, in the absence of solid-appearing surfaces and despite binocular cues, depth perception can be poor and complex objects can appear to be "stroke spaghetti" instead of coherent 3D objects. To enable increased depth perception, in the operating mode 212 "fill," the sketching application 130 generates solid surfaces 186 based on the 2D input 194.

The active canvas selection 214 specifies the active canvas 128. The active canvas selection 214 can be one of a planar canvas (not shown), one of the surface patches 184 included in the model 180, or one of the surface patches 184 included in the in situ dataset 170 (not shown in FIG. 2). Initially, the sketching application 130 generates a default planar canvas having an aspect ratio that roughly matches the aspect ratio of the 2D drawing surface 172. The sketching application 130 then causes the hybrid input/output subsystem 150 to display the default planar canvas via the 2D drawing surface 172 as well as at a fixed location in 3D in mid-air. The planar canvas enables the sketching application 130 to convert the constrained gestures 192 to planar curves 182 without foreshortening based on the active canvas 128.

When the sketching application 130 generates a new surface patch 184, the sketching application 130 sets the active canvas 128 equal to the new surface patch 184 via the active canvas selection 214. In addition, the sketching application 130 may provide any number and type of mechanisms to generate, specify, and/or manipulate the active canvas selection 214. For instance, in some embodiments, the sketching application 130 may provide a planar canvas tool that generates a new planar canvas at a specified position in 3D space. The planar canvas tool then updates the active canvas selection 214 to specify the new planar canvas. In the same or other embodiments, the sketching application 120 provides any number of 3D canvas manipulation tools and 2D canvas manipulation tools. The 3D canvas manipulation tools enable users to manipulate a mid-air representation of the active drawing canvas 128 in 3D. The 2D canvas manipulation tools enable users to rotate and scale the active drawing canvas 128 via the 2D drawing surface 172 and/or the menu 174.

In various embodiments, the sketching application 130 includes bookmark functionality that is accessed via the menu 174. Each bookmark is a different surface patch 184 or planar canvas, and any number of bookmark navigation buttons included in the menu 174 enable the user to specify the active canvas selection 214. Notably, the bookmarks may include the surface patches 184 that are included in the in situ dataset 170 as well as the surface patches 184 that are included in the model 180.

The canonical workspace 216 specifies the 3D region in which the hybrid input/output subsystem 150 senses the free-form gestures 122 and displays the 3D output 126. By contrast, the mapped workspace 218 specifies an optional, additional 3D region in which the hybrid input/output subsystem 150 displays a mapped 3D output 226. The mapped 3D output 226 is a scaled version of the canonical workspace 216. As persons skilled in the art will recognize, most AR and VR environments, including the environment provided by the hybrid input/output subsystem 150 support gesturing and visualization at any scale. However, gesturing at some scales can be difficult and, consequently, negatively impact the precision of the free-form gestures 122. Accordingly, the sketching application 130 optionally maps the 3D output 126 associated with the same scale as the free-form gestures 122 to the mapped 3D output 226 associated with a different scale.

The sketching application 130 may provide any number and type of tools that enable user specification of the canonical workspace 216 and the mapped workspace 218. For instance, in some embodiments, the sketching application 130 provides a button in the menu 174 that sets the operating mode 212 to "define canonical workspace" or "define mapped workspace." When in the define canonical workspace or the define mapped workspace mode, the sketching application 130 displays two rays in 3D. The first ray emanates from the head of a user, and the second ray eliminates from the tip of the digital pen.

Subsequently, the sketching application 130 detects a mouse click and, in response, creates a first 3D point at an approximate intersection of the two rays. The approximate intersection is the mid-point of the shortest line segment between the two rays. The first 3D point is one corner of the workspace. The sketching application 130 detects a subsequent mouse click and, in response creates a second 3D point at appropriately the intersection of the two rays. The second 3D point is a second corner of the workspace and is diagonally opposite the first 3D point.

The free-form input engine 220 receives the 3D input 124 from the hybrid input/output subsystem 150 and generates a corresponding curve 182. The free-form input engine 220 includes, without limitation, an instance of a smoothing engine 222(1) and a smoothing factor 224(1). In general, the smoothing engine 222 implements any number and type of real-time smoothing techniques in any technically feasible fashion to generate a sequence of N output points {p(i)} based on a sequence of N input points {s(i)}, and the smoothing factor 224.

For instance, in some embodiments, the smoothing engine 222 sets the first output point p(0) equal to the first input point s(0). The smoothing engine 222 sequentially computes each of the interior input points p(x), where 0<x<N, based on the following equation (1):

$$p(x)=p(x-1)+F(s(x)-p(x-1)), 0<x<N \qquad (1)$$

In equation (1), F( ) is a connection function that is parameterized based on the sketching speed and the smoothing factor 224. In this fashion, the smoothing engine 222 generates interior output points that are modulated with respect to the input points by the smoothing factor 224 and the sketching speed. Finally, the smoothing engine 222 sets the last output point p(N) equal to the last input point s(N). Subsequently, the smoothing engine 222 reparametrizes the sequence of output points based on arc-length to increase the suitability of the sequence of output points for both surface patch fitting and rendering.

Notably, because of the imprecision typically associated with performing gestures in 3D, the smoothing factor 224(1) associated with the 3D input 124 is relatively high. After the smoothing engine 222(1) generates the sequence of output points based on the 3D input 124, the 3D input engine 220 performs multiple iterations (e.g., 10) of bi-Laplacian smoothing on the sequence of output points to remove additional jitter. Subsequently, the 3D input engine 220 generates the new curve 182 based on the sequence of output points.

The 3D input engine 220 may represent the curve 182 in any technically feasible fashion. For instance, in some embodiments, the 3D input engine 220 represents the curve 182 as a ribbon (i.e., a flat narrow sheet) or a tube (i.e., a generalized cylinder). The 3D input engine 220 then adds the curve 182 to the model 180. As part of adding the curve 182 to the model 180, the 3D input engine 220 may associate the curve 182 with any number of curve lists 232 and/or any number of surface patches 184 in any technically feasible fashion. In various embodiments, the 3D input engine 220 may also associate the curve 182 with the free-form gesture 122 or free-form gesturing in any technically feasible fashion.

The constrained input engine 230 receives the 2D input 194 from the hybrid input/output subsystem 150 and generates a corresponding curve 182. The constrained input engine 230 includes, without limitation, an instance of the smoothing engine 222(2) the smoothing factor 224(2), a constraint engine 232, and a fill engine 234. The smoothing engine 222(2) is described above. However, because of the precision typically associated with performing gestures on 2D surfaces, the smoothing factor 224(2) associated with the constrained input 194 is relatively low. In alternate embodiments, the 3D input engine 220 and the constrained input engine 230 may implement different numbers and types of smoothing techniques.

Subsequently, the constraint engine 232 projects the sequence of output points to the active canvas 128 to generate a new curve 182. Notably, if the active canvas 128 in non-planar, then the new curve 182 may also be non-planar. Accordingly, the constraint engine 232 translates the constrained gestures 192 performed via the 2D drawing surface 172 to 3D curves 182 based on any number of previous free-form gestures 122 and any number of previous constrained gestures 192, in any combination. The constraint engine 232 may constrain the output points to the active canvas 128 in any technically feasible fashion. Further, the constraint engine 232 may represent the curve 182 in any technically feasible fashion that is consistent with both the free-form input engine 210 and the model 180. For instance, in some embodiments, both the constraint engine 232 and the free-form input engine 210 represents each curve 182 as a ribbon or a tube.

If the operating mode 212 is equal to "fill," then the fill engine 234 generates a new solid surface 186 based on the new curve 182. The fill engine 234 may generate the new solid surface 184 in any technically feasible fashion. For instance, in some embodiments, the fill engine 234 connects the first point and the last point included in the curve 182 to automatically close the curve 182. The fill engine 234 then triangulates the region enclosed by the curve 182 to generate a triangular mesh. The triangular mesh is the new solid surface 186. Finally, the fill engine 234 associates the new solid surface 184 with a solid color and adds the solid surface 184 to the model 180. In alternate embodiments, the fill engine 234 may represent the solid surface 186 and configure the solid surface 186 to provide any amount of texture, shading, occlusion, shadows, and the like in any technically feasible fashion.

If, however, the operating mode 212 is not equal to "fill," then the constrained input engine 232 adds the curve 182 to the model 180. As part of adding the curve 182 to the model 180, the constrained input engine 230 may associate the curve 182 with any number of curve lists 232 and/or any number of surface patches 184 in any technically feasible fashion. In various embodiments, the constrained input engine 232 may also associate the curve 182 with the constrained gesture 192 or constrained gesturing in any technically feasible fashion.

When the operating mode 212 is equal to "generate surface," the surface engine 240 generates a new surface patch 184 based on an associated curve list 232. Notably, the curve list 232 may include any number (including zero) of curves 182 derived from the free-form gestures 122 and any number (including zero) of curves 182 derived from the constrained gestures 192, in any combination. The surface engine 240 may generate and represent the surface patch 184 in any technically feasible fashion.

For instance, in some embodiments, the surface engine 240 performs a two phase surface-fitting process to generate the surface patch 184. In a first phase, the constrained input engine 232 determines a best-fit plane for the curves 182 included in the curve list 232. More precisely, the surface engine 240 samples a fixed number of points from each of the curves 182 included in the curve list 232. The surface engine 240 then solves for the best-fit plane in a least-squares sense. Notably, the sketching application 130 maps the +Y and −Z axes of the best-fit plane to, respectively, the up and forward directions in the orthographic view of the active canvas 128 that the sketching application 130 displays via the 2D drawing surface 172.

In the second phase, the surface engine 240 minimizes thin plane spline energy to fit a smooth height field to the curves 182 included in the curve list 232 relative to the best-fit plane. To mitigate any inaccuracies associated with the curves 182, the surface engine 240 implements an approximate fitting algorithm based on a regulation parameter A. If the regulation parameter is equal to zero, then the approximate fitting algorithm attempts to precisely fit the input points included in the curves 182. As the value of the regulation parameter increases, the approximate fitting algorithm sacrifices fit precision for smoothness.

In some embodiments, because the constrained gestures 192 are typically more precise than the free-form gestures 122, the surface engine 240 varies the regulation parameters based on the origin of the curves 182. More specifically, if a given curve 182 is associated with constrained gesturing, then the surface engine 240 sets the associated regulation parameter equal to zero. By contrast, if a given curve 182 is associated with free-form gesturing, then the surface engine 240 sets the associated regulation parameter equal to a higher value, such as 0.1.

The free-form display engine 250 generates the 3D output 126 and, optionally, the mapped 3D output 226. In general, the 3D output 126 configures the hybrid input/output subsystem 150 to visually represent the virtual geometries included in the model 180 within the canonical workspace 216. If the mapped workspace 218 is defined, then the mapped 3D output 226 configures the hybrid input/output subsystem 150 to visually represent the virtual geometries included in the model 180 within the mapped workspace 218.

The free-form display engine 250 may generate the 3D output 126 in any technically feasible fashion that is compatible with the mid-air display components included in the hybrid input/output subsystem 150. In alternate embodiments, the sketching application 130 may provide any number and type of mechanisms that enable selection of a portion of the virtual geometries included in the model 180 for display purposes. In such embodiments, the free-form display engine 250 generates the 3D output 126 that visually represents the selected portion of the virtual geometries included in the model 180. In various embodiments, the free-form display engine 250 may include any amount and type of visual aids in the 3D output 126. For instance, in some embodiments, the free-form display engine 250 displays a grid texture on the active canvas 128 and a mid-air virtual pointer.

In some embodiments, the free-form display engine 250 implements a tube rendering algorithm to generate the 3D output 126 that visually represents the curves 182 included in the model 180. For each of the curves 182, the free-form display engine 250 computes an orthogonal 3D frame at each segment of the curve 182, where one of the three orthogonal directions is the tangent to the curve 182 at the segment. Starting with an arbitrary frame at the first segment, the free-form display engine 250 performs parallel transport techniques to compute the Bishop frame for the remainder of the curve 182.

In various embodiments, the free-form display engine 250 varies the thicknesses of the displayed tube. More precisely, if the curve 182 is associated with the constrained gesture 192, then the free-form display engine 240 sets the thickness of the displayed tube based on the normalized pressure value at each point included in the gesture 192. If, however, the curve 182 is associated with the free-form gesture 122, then the free-form display engine 250 sets the thickness of the displayed tube based on a user-configurable thickness parameter.

As shown, the free-form display engine 250 includes, without limitation, a mapping engine 252. If the mapped workspace 218 is defined, then the mapping engine 252 performs any amount and type of mapping and/or scaling operations on the 3D output 126 to generate the mapped 3D output 226. For instance, in some embodiments, the free-form display engine 250 generates the mapped 3D output 226 based on a mapping between an input position pc in the canonical workspace 216 to an output position pm in the mapped workspace 218 based on following equation (2):

$$pm = \|q1 - q2\| pc + (q1 + q2)/2 \qquad (2)$$

In equation 2, q1 and q2 are two 3D points that are at diagonally opposite corners of the mapped workspace 218. In alternate embodiments, the free-form display engine 250 may implement any type of mapping based on any definitions of the canonical workspace 216 and the mapped workspace 218. In the same or other alternate embodiments, the free-form display engine 250 may compute the mapped 3D output 226 directly based on the model 180 in any technically feasible fashion.

The constrained rendering engine 260 generates the 2D output 196 based on the model 180 and the active canvas selection 214. More precisely, the constrained rendering engine 260 configures the hybrid input/output subsystem 150 to project an orthographic view of the active canvas 128 and any associated virtual geometries—constrained to the active canvas 128—to the 2D drawing surface 172. The constrained rendering engine 260 may implement any number and type of rendering techniques to constrain and display the virtual geometries.

In various embodiments, the constrained rendering engine 260 may render the active canvas 128 based on the best-fit plane and height field described above in conjunction with the surface engine 240. Notably, in some embodiments, as part of rending the active canvas 128, the constrained rendering engine 260 computes a bounding rectangle based on the "defining" curves 182 included in the curve list 232 defining the active canvas 128. The constrained rendering engine 260 then performs clipping operations based on the bounding rectangle of the defining curves 182 on the best-fit plane to provide the appearance of a rectangle that is curved in 3D. If, however, the projection of the largest enclosing defining curve 182 is approximately a closed simple curve, then the constrained rendering engine 260 further trims the active canvas 182 against the largest enclosing defining curve 182 to provide a more visually representative appearance for the active canvas 128.

In the same or other embodiments, the constrained rendering engine 260 renders the non-defining curves 182 associated with the active canvas 128 based on the tube rendering algorithm described above in conjunction with the 3D output engine 250. In various embodiments, the constrained rendering engine 260 renders the solid surfaces 186 associated with the active canvas 128 based on a constrained Delaunay triangulation (CDT) technique. To render a given solid surface 186, the constrained rendering engine 260 computes a CDT using all the segments of the defining curve 182 associated with the solid surface 186 as constraints. First, the constrained rendering engine 260 computes the CDT on a convex region covering the defining curve 182. The constrained rendering engine 260 then removes the triangles outside the region enclosed by the defining curve 182. Subsequently, the constrained rendering engine 260 projects the vertices of the triangulation onto the active canvas 128 for display with an associated solid color.

The constrained rendering engine 260 may configure the 2D display components of the hybrid input/output subsystem 150 in any technically feasible fashion. For instance, in some embodiments, the 2D drawing surface 172 is a touch screen included in a tablet, and the constrained rendering engine 260 scales the viewport of a camera included in the tablet based on the dimensions of the active canvas 128. In various embodiments, the constrained rendering engine 260 may include any amount and type of visual aids in the 2D output 196. For instance, in some embodiments, the constrained rendering engine 260 displays a grid texture on the active canvas 128.

Figure 3:
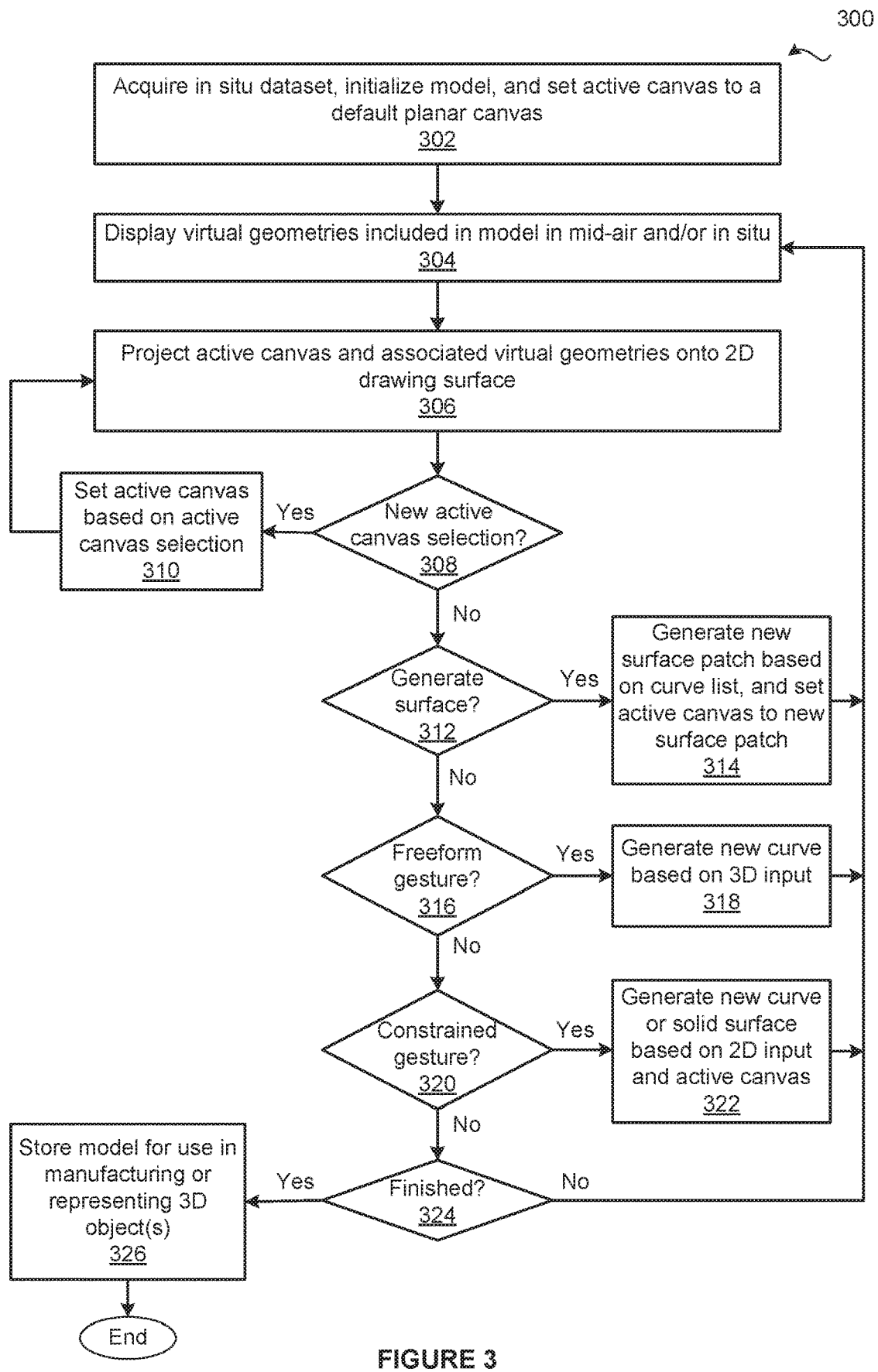
FIG. 3 is a flow diagram of method steps for generating a model of a three-dimensional (3D) object based on user gestures, according to various embodiments of the present invention.

FIG. 3 is a flow diagram of method steps for generating a model of a three-dimensional (3D) object based on user gestures, according to various embodiments of the present invention. Although the method steps are described with reference to the systems of FIGS. 1-2, persons skilled in the art will understand that any system configured to implement the method steps, in any order, falls within the scope of the present invention.

As shown, a method 300 begins at step 302, where the sketching application 130 acquires the in situ dataset 170, initializes the model 180 to have no virtual geometries, and sets the active canvas 128 equal to a default planar canvas. At step 304, the free-form display engine 250 configures the hybrid input/output subsystem 150 to display the virtual geometries included in the model 180 in mid-air and/or in situ. At step 306, the constrained rendering engine 260 configures the hybrid input/output subsystem 150 to project the active canvas 128 and any associated virtual geometries onto the 2D drawing surface 172.

At step 308, the sketching application 130 determines whether the sketching application 130 has received a new active canvas selection 214. If, at step 308, the sketching application 130 determines that the sketching application 130 has received a new active canvas selection 214, then the method 300 proceeds to step 310. At step 310, the sketching application 130 determines the active canvas 128 based on the active canvas selection 214. The method 300 then returns to step 306, where the constrained rendering engine 260 projects the new active canvas 128 and any associated virtual geometries onto the 2D drawing surface 172.

If, however, at step 308, the sketching application 130 determines that the sketching application 130 has not received a new active canvas selection 214, then the method 300 proceeds directly to step 312. At step 312, the sketching application 130 determines whether the operating mode 212 is equal to "generate surface." If, at step 312, the sketching application determines that the operating mode 212 is equal to "generate surface," then the method 300 proceeds to step 314. At step 314, the surface engine 240 generates a new surface patch 184 based on an associated curve list 232 and then sets the active canvas 128 equal to the new surface patch 184. The method 300 then returns to step 304, where the free-form display engine 250 displays the new surface patch 184 in mid-air and/or in situ.

If, however, at step 312, the sketching application 130 determines that the operating mode 212 is not equal to "generate surface," then the method 300 proceeds directly to step 316. At step 316, the sketching application 130 determines whether the hybrid input/output subsystem 150 has received a new free-form gesture 122. If, at step 316, the sketching application 130 determines that the hybrid input/output subsystem 150 has received a new free-form gesture 122, then the method 300 proceeds to step 318. At step 318, the free-form input engine 210 generates a new curve 182 based on the 3D input 124 associated with the free-form gesture 122. As part of step 318, if the operating mode 212 is equal to "define surface," then the free-form input engine 210 adds the new curve 182 to the curve list 232. Otherwise, the free-form input engine 210 adds the new curve 182 to the model 180. The method 300 then returns to step 304, where the free-form display engine 250 displays the new curve 182 in mid-air and/or in situ.

If, however at step 316, the sketching application 130 determines that the hybrid input/output subsystem 150 has not received a new free-form gesture 122, then the method 300 proceeds directly to step 320. At step 320, the sketching application 130 determines whether the hybrid input/output subsystem 150 has received a new constrained gesture 192. If, at step 320, the sketching application 130 determines that the hybrid input/output subsystem 150 has received a new constrained gesture 192, then the method 300 proceeds to step 322.

At step 322, the constrained input engine 230 generates a new curve 182 or new solid surface 186 based on the 2D input 194 associated with the constrained gesture 192, and adds the new virtual geometry to the model 180. As part of step 322, irrespective of the operating mode, the constrained input engine 230 generates a new curve 182 based on the 2D input 194 and the active canvas 128. Subsequently, if the operating mode 212 is equal to "fill", then the fill engine 234 generates a new solid surface 186 based on the new curve 182 and adds the new solid surface 186 to the model 180. If, however, the operating mode 212 is equal to "define surface," then the constrained input engine 230 adds the curve 182 to a curve list 232. If, however, the operating mode 212 is equal to "sketching," then the constrained input engine 230 adds the curve 182 to the model 180. The method 300 then returns to step 304, where the free-form display engine 250 displays the new curve 182 or the new solid surface 186 in mid-air and/or in situ.

If, however, at step 320, the sketching application 130 determines that the hybrid input/output subsystem 150 has not received a new constrained gesture 192, then the method 300 proceeds directly to step 324. At step 324, the sketching application 130 determines whether the sketching application 130 is to finish executing (e.g., receives a request to exit, etc.). If, at step 324, the sketching application 130 determines that the sketching application 130 is to continue executing, then the method 300 returns to step 304, where the free-form display engine 250 displays the virtual geometries included in the model 180 in mid-air and/or in situ. If, however, at step 324, the sketching application 130 determines that the sketching application 130 is to finish executing, then the method 300 proceeds to step 326. At step 326, the sketching application 130 stores the model 180 in any technically feasible file format for use in manufacturing the associated 3D object(s) and/or representing the associated 3D object(s) in another application. The method 300 then terminates.

In sum, the disclosed techniques may be used to efficiently and accurately generate models of detailed 3D objects. A sketching application integrates 3D input and 2D input to generate a model of a 3D object. The 3D input is derived from free-form gestures performed by a user in mid-air or in situ, and the 2D input is derived from constrained gestures performed by the user on a 2D drawing surface. The model includes, without limitation, any number of virtual geometries. To facilitate free-form gesturing, the sketching application displays the virtual geometries included in the 3D model in mid-air or in situ. By contrast, to facilitate constrained gesturing, the sketching application displays a projection of an active canvas and any associated virtual geometries on the 2D drawing surface. Further, the sketching application constrains the 2D input to the active canvas. At any given time, the active canvas is one of a planar canvas, a surface patch that is included in the model, or a surface patch that is included in situ dataset. The active canvas may change over time. Notably, if the active canvas is a 3D surface patch that represents a curved surface, then the sketching application constrains the 2D input to the curved surface.

Advantageously, by generating models of 3D objects based on both free-form gestures and constrained gestures, the sketching application addresses various drawbacks of using conventional CAD applications to generate 3D models. In particular, by generating surface patches based on free-form gestures, the sketching application automatically captures the 3D depths of geometries without requiring numerous, typically time-intensive, 2D sketches. In a complementary fashion, by mapping constrained gestures performed on the 2D drawing surface to 3D surface patches, the sketching application precisely captures detailed 3D geometries. By rendering 3D surface patches to the 2D drawing surface to facilitate precise 2D gesturing, the sketching application enables users to efficiently and accurately describe complex 3D geometries using a coordinated mix of free-form gestures and constrained gestures. These technical advantages provide one or more technological advancements over the prior art.

1. In some embodiments, a computer-implemented method for generating models of three-dimensional (3D) objects comprises generating a first virtual geometry based on a first free-form gesture; generating a second virtual geometry based on a first constrained gesture associated with a two-dimensional (2D) physical surface; and generating a model of a 3D object based on the first virtual geometry and the second virtual geometry.

2. The computer-implemented method of clause 1, wherein the first virtual geometry comprises a 3D surface patch or a 3D curve.

3. The computer-implemented method of clauses 1 or 2, wherein generating the first virtual geometry comprises generating a first 3D curve based on the first constrained gesture; and performing one or more surface-fitting operations on a plurality of 3D curves that includes the first 3D curve.

4. The computer-implemented method of any of clauses 1-3, further comprising performing one or more orthographic projection operations to display the first virtual geometry on the 2D physical surface.

5. The computer-implemented method of any of clauses 1-4, further comprising configuring a display system to display the second virtual geometry in mid-air.

6. The computer-implemented method of any of clauses 1-5, wherein generating the second virtual geometry comprises projecting the second gesture onto the first virtual geometry.

7. The computer-implemented method of any of clauses 1-6, wherein generating the first virtual geometry comprises generating a 3D curve based on the first gesture; performing one or more smoothing operations on the 3D curve to generate a smoothed 3D curve; and generating an enclosed region based on the smoothed 3D curve.

8. The computer-implemented method of any of clauses 1-7, further comprising detecting that an input device is proximate to the 2D physical surface; determining a mid-air position within a 3D workspace, and visually indicating the mid-air position within the 3D workspace.

9. The computer-implemented method of any of clauses 1-8, further comprising displaying the second virtual geometry in mid-air at a first position within a 3D workspace; mapping the first position to a second position within a mapped 3D workspace; and displaying the second virtual geometry in mid-air at the second position within the 3D workspace.

10. The computer-implemented method of any of clauses 1-9, wherein the first gesture is performed in a virtual reality environment or an augmented reality environment.

11. In some embodiments, one or more non-transitory computer readable media include instructions that, when executed by one or more processors, cause the one or more processors to perform the steps of generating a first virtual geometry based on a first free-form gesture; generating a second virtual geometry based on a first constrained gesture associated with a two-dimensional (2D) physical surface; and generating a model of a 3D object based on the first virtual geometry and the second virtual geometry.

12. The one or more non-transitory computer readable media of clause 11, wherein the first virtual geometry comprises a 3D surface patch or a 3D curve.

13. The one or more non-transitory computer readable media of clauses 11 or 12, wherein generating the first virtual geometry comprises computing a best-fit plane based on the first gesture and a second gesture; and computing a height field based on the best-fit plane, wherein the best-fit plane and the height field specify a surface patch.

14. The one or more non-transitory computer readable media of any of clauses 11-13, further comprising configuring a display system to display the first virtual geometry via the 2D physical surface.

15. The one or more non-transitory computer readable media of any of clauses 11-14, further comprising displaying the second virtual geometry in situ on an existing 3D object.

16. The one or more non-transitory computer readable media of any of clauses 11-15, wherein generating the second virtual geometry comprises projecting the second gesture onto the first virtual geometry.

17. The one or more non-transitory computer readable media of any of clauses 11-16, wherein generating the first virtual geometry comprises generating a 3D curve based on the first gesture; connecting a first point included in the 3D curve and a last point included in the 3D curve to generate a region that is associated with at least one of texture, shading, occlusion, and shadowing.

18. The one or more non-transitory computer readable media of any of clauses 11-17, wherein generating the first virtual geometry comprises performing one or more smoothing operations on a 3D curve associated with the first free-form gesture.

19. The one or more non-transitory computer readable media of any of clauses 11-18, further comprising displaying the second virtual geometry in mid-air at a first position within a 3D workspace; mapping the first position to a second position within a mapped 3D workspace; and displaying the second virtual geometry in mid-air at the second position within the 3D workspace.

20. In some embodiments, a system comprises a two-dimensional (2D) physical surface; one or more memories storing instructions; and one or more processors that are coupled to the one or more memories and, when executing the instructions, are configured to generate a first virtual geometry based on a first free-form gesture; generate a second virtual geometry based on a first constrained gesture associated with the 2D physical surface; and generate a model of a 3D object based on the first virtual geometry and the second virtual geometry.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for generating models of three-dimensional (3D) objects, the method comprising:
    generating a first virtual geometry based on a first free-form gesture;
    generating a first curve based on the first virtual geometry and a first value of a regulation parameter;
    generating a second virtual geometry based on a first constrained gesture associated with a two-dimensional (2D) physical surface;
    generating a second curve based on the second virtual geometry and a second value of the regulation parameter, wherein the second value of the regulation parameter is lower than the first value of the regulation parameter and indicates that the second curve fits the second virtual geometry more precisely than the first curve fits the first virtual geometry; and
    generating a model of a 3D object based on the first curve and the second curve.

2. The computer-implemented method of claim 1, wherein the first virtual geometry comprises a 3D surface patch or a 3D curve.

3. The computer-implemented method of claim 1, wherein generating the first virtual geometry comprises:
    generating a first 3D curve based on the first constrained gesture; and
    performing one or more surface-fitting operations on a plurality of 3D curves that includes the first 3D curve.

4. The computer-implemented method of claim 1, further comprising performing one or more orthographic projection operations to display the first virtual geometry on the 2D physical surface.

5. The computer-implemented method of claim 1, further comprising configuring a display system to display the second virtual geometry in mid-air.

6. The computer-implemented method of claim 1, wherein generating the second virtual geometry comprises projecting the first constrained gesture onto the first virtual geometry.

7. The computer-implemented method of claim 1, wherein generating the first virtual geometry comprises:
    generating a 3D curve based on the first constrained gesture;
    performing on or more smoothing operations on the 3D curve to generate a smoothed 3D curve; and
    generating an enclosed region based on the smoothed 3D curve.

8. The computer-implemented method of claim 1, further comprising:
    detecting that an input device is proximate to the 2D physical surface;
    determining a mid-air position of the input device within a 3D workspace; and
    visually indicating the mid-air position within the 3D workspace.

9. The computer-implemented method of claim 1, further comprising:
    displaying the second virtual geometry in mid-air at a first position within a 3D workspace;
    mapping the first position to a second position within a mapped 3D workspace; and
    displaying the second virtual geometry in mid-air at the second position within the 3D workspace.

10. The computer-implemented method of claim 1, wherein the first free-form gesture is performed in a virtual reality environment or an augmented reality environment.

11. One or more non-transitory computer readable media including instructions that, when executed by one or more processors, cause the one or more processors to perform steps of:
    generating a first virtual geometry based on a first free-form gesture;
    generating a first curve based on the first virtual geometry and a first value of a regulation parameter;
    generating a second virtual geometry based on a first constrained gesture associated with a two-dimensional (2D) physical surface;

generating a second curve based on the second virtual geometry and a second value of the regulation parameter, wherein the second value of the regulation parameter is lower than the first value of the regulation parameter and indicates that the second curve fits the second virtual geometry more precisely than the first curve fits the first virtual geometry; and generating a model of a 3D object based on the first curve and the second curve.

12. The one or more non-transitory computer readable media of claim 11, wherein the first virtual geometry comprises a 3D surface patch or a 3D curve.

13. The one or more non-transitory computer readable media of claim 11, wherein generating the first virtual geometry comprises:

computing a best-fit plane based on the first free-form gesture and a second gesture; and computing a height field based on the best-fit plane, wherein the best-fit plane and the height field specify a surface patch.

14. The one or more non-transitory computer readable media of claim 11, further comprising configuring a display system to display the first virtual geometry via the 2D physical surface.

15. The one or more non-transitory computer readable media of claim 11, further comprising displaying the second virtual geometry in situ on an existing 3D object.

16. The one or more non-transitory computer readable media of claim 11, wherein generating the second virtual geometry comprises projecting the first constrained gesture onto the first virtual geometry.

17. The one or more non-transitory computer readable media of claim 11, wherein generating the first virtual geometry comprises:

generating a 3D curve based on the first constrained gesture; and connecting a first point included in the 3D curve and a last point included in the 3D curve to generate a region that is associated with at least one of texture, shading, occlusion, or shadowing.

18. The one or more non-transitory computer readable media of claim 11, wherein generating the first virtual geometry comprises performing one or more smoothing operations on a 3D curve associated with the first free-form gesture.

19. The one or more non-transitory computer readable media of claim 11, further comprising:

displaying the second virtual geometry in mid-air at a first position within a 3D workspace;

mapping the first position to a second position within a mapped 3D workspace; and displaying the second virtual geometry in mid-air at the second position within the 3D workspace.

20. A system, comprising:

a two-dimensional (2D) physical surface;

one or more memories storing instructions; and one or more processors that are coupled to the one or more memories and, when executing the instructions, are configured to:

generate a first virtual geometry based on a first free-form gesture, generate a first curve based on the first virtual geometry and a first value of a regulation parameter, generate a second virtual geometry based on a first constrained gesture associated with the 2D physical surface, generate a second curve based on the second virtual geometry and a second value of the regulation parameter, wherein the second value of the regulation parameter is lower than the first value of the regulation parameter and indicates that the second curve fits the second virtual geometry more precisely than the first curve fits the first virtual geometry, and generate a model of a 3D object based on the first curve and the second curve.

* * * * *